United States Patent
Von Knorring et al.

(10) Patent No.: US 11,932,821 B2
(45) Date of Patent: Mar. 19, 2024

(54) USE OF ORGANOMETALLIC SALT COMPOSITIONS FOR ALLEVIATING THE FORMATION OF WHITE ETCHING CRACKS

(71) Applicant: Ab Nanol Technologies Oy, Raisio (FI)

(72) Inventors: Johan Von Knorring, Helsinki (FI); Samuli Lempiäinen, Åbo (FI); Sophia Von Haartman, Åbo (FI); Aubrey Burrows, Norfolk (GB); Mathias Scherge, Malsch (DE)

(73) Assignee: Ab Nanol Technologies Oy, Raisio (FI)

( * ) Notice: Subject to any disclaimer, the term of this patent is extended or adjusted under 35 U.S.C. 154(b) by 0 days.

(21) Appl. No.: 17/763,667

(22) PCT Filed: Sep. 23, 2020

(86) PCT No.: PCT/FI2020/050622
§ 371 (c)(1),
(2) Date: Mar. 25, 2022

(87) PCT Pub. No.: WO2021/058868
PCT Pub. Date: Apr. 1, 2021

(65) Prior Publication Data
US 2022/0403281 A1    Dec. 22, 2022

(30) Foreign Application Priority Data
Sep. 27, 2019    (EP) .................................... 19397529

(51) Int. Cl.
*C10M 129/40*    (2006.01)
*C10M 169/04*    (2006.01)

(52) U.S. Cl.
CPC ........ *C10M 129/40* (2013.01); *C10M 169/04* (2013.01); *C10M 2203/003* (2013.01); *C10M 2203/024* (2013.01)

(58) Field of Classification Search
CPC .............. C10M 129/40; C10M 169/04; C10M 2203/003; C10M 2203/024; C10M 159/18;
(Continued)

(56) References Cited

U.S. PATENT DOCUMENTS 4,705,641 A * 11/1987 Goldblatt ............. C10M 141/08
252/400.1
5,558,805 A * 9/1996 Colclough ........... C10M 135/00
508/262
(Continued)

FOREIGN PATENT DOCUMENTS

CN    101432404 A    5/2009
CN    103347989 A    10/2013
(Continued)

OTHER PUBLICATIONS

Manieri et al: The origins of white etching cracks and their significance to rolling bearing failures. International Journal of Fatigue, 2019, vol. 120, pp. 107-133.
(Continued)

*Primary Examiner* — Ellen M McAvoy
(74) *Attorney, Agent, or Firm* — Laine IP Oy

(57) ABSTRACT

The present invention relates to the use of organometallic salt compositions as lubricant additives and/or lubricant additive compositions to alleviate the formation of white etching cracks (WEC).

23 Claims, 1 Drawing Sheet

(58) Field of Classification Search
CPC ............ C10M 139/00; C10M 2201/06; C10M 2201/062; C10M 2207/122; C10M 2207/126; C10N 2030/06; C10N 2030/14; C10N 2040/00; C10N 2040/04; C10N 2010/02; Y02E 10/72
See application file for complete search history.

(56) References Cited

U.S. PATENT DOCUMENTS

| | | | | |
|---|---|---|---|---|
| 5,786,307 | A * | 7/1998 | Igarashi | C10M 135/18 508/459 |
| 5,994,277 | A * | 11/1999 | Ritchie | C10M 167/00 508/375 |
| 6,358,894 | B1 * | 3/2002 | Leta | C10M 135/18 508/363 |
| 10,144,896 | B2 | 12/2018 | Ekman et al. | |
| 11,643,615 | B2 * | 5/2023 | Maruyama | C10M 115/08 508/365 |
| 2004/0087452 | A1 * | 5/2004 | Noles | C10M 163/00 508/363 |
| 2009/0016652 | A1 | 1/2009 | Endo et al. | |
| 2009/0221460 | A1 * | 9/2009 | Habeeb | C10M 169/045 508/370 |
| 2017/0158980 | A1 * | 6/2017 | Ekman | C10M 125/04 |
| 2018/0194707 | A1 | 7/2018 | Burrows et al. | |
| 2019/0128327 | A1 * | 5/2019 | Kruhöffer | F16C 33/585 |
| 2020/0040276 | A1 * | 2/2020 | Amblard | C10M 169/044 |
| 2020/0248096 | A1 * | 8/2020 | Maruyama | C10M 107/02 |
| 2022/0403281 | A1 * | 12/2022 | Von Knorring | C10M 129/40 |
| 2023/0079734 | A1 * | 3/2023 | Aho | C10M 129/40 |

FOREIGN PATENT DOCUMENTS

| | | | |
|---|---|---|---|
| CN | 106574204 A | 4/2017 | |
| EP | 0449455 A2 | 10/1991 | |
| EP | 0949320 A2 | 10/1999 | |
| EP | 2003187 A2 | 12/2008 | |
| EP | 3115443 A1 * | 1/2017 | ............ C07C 51/41 |
| JP | S63304096 A | 12/1988 | |
| JP | H10121083 A | 5/1998 | |
| JP | H10121077 A | 12/1998 | |
| JP | H11140480 A | 5/1999 | |
| JP | 2002241781 A | 8/2002 | |
| JP | 2003106338 A | 4/2003 | |
| JP | 2007069423 A | 3/2007 | |
| JP | 2007262300 A | 10/2007 | |
| JP | 2018521208 A | 8/2018 | |
| WO | WO2015173421 A2 | 11/2015 | |
| WO | WO2017005967 A1 | 1/2017 | |

OTHER PUBLICATIONS

Prashant et al: Influence of Cu nanofluids on the rolling contact fatigue life of bearing steel. Engineering Failure Analysis, Mar. 20, 2017, vol. 78, pp. 110-121.

* cited by examiner

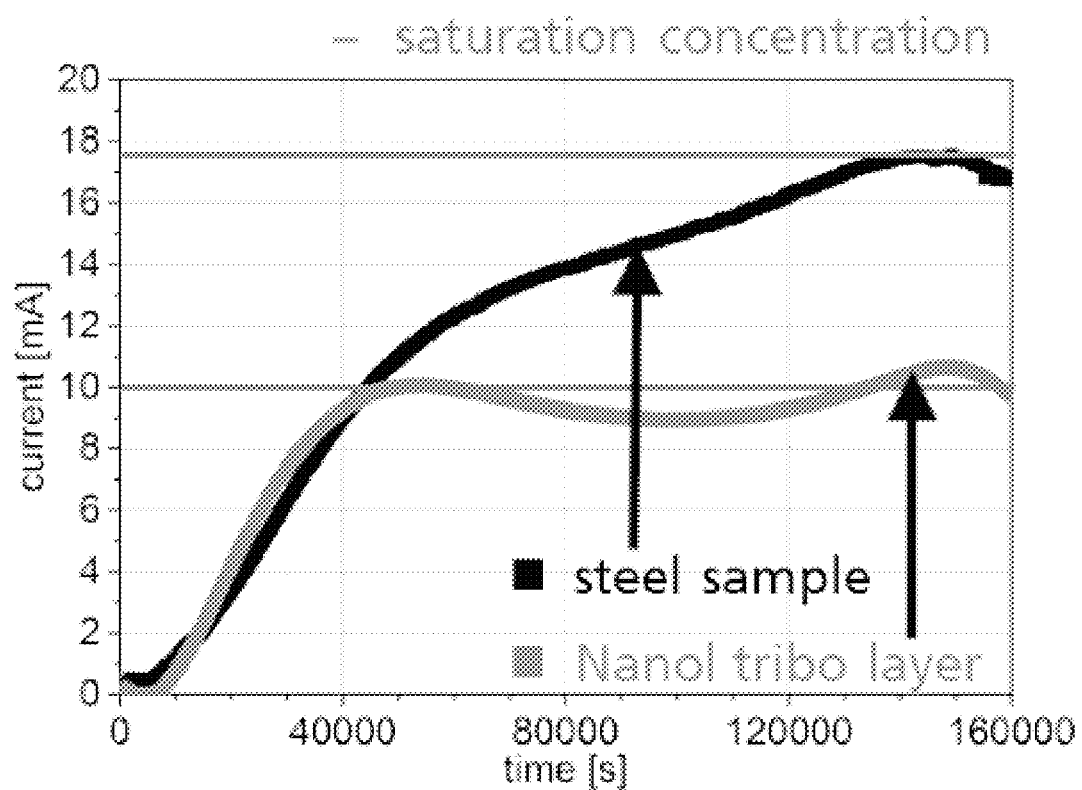

under all lubricating conditions including boundary, mixed and elastohydrodynamic lubrication (EHL).

USE OF ORGANOMETALLIC SALT COMPOSITIONS FOR ALLEVIATING THE FORMATION OF WHITE ETCHING CRACKS

BACKGROUND OF THE INVENTION

Field of the Invention

The present invention relates to the use of organometallic salt compositions as lubricant additives and/or lubricant additive compositions to alleviate the formation of white etching cracks (WEC).

The salt compositions are particularly useful in combination with activated complexes comprising a first metal component, a second metal component, and particles comprising the first metal component.

Description of Related Art

Organometallic salts prepared from fatty acids are frequently incorporated into oils and greases to provide lubricating compositions having special properties. The organometallic salts can be based on different metal elements, with copper based additives being preferred because of their effectiveness in such lubricants.

Several types of copper compounds including copper dithiophosphates, dithiocarbamates, sulphonates, carboxylates, acetylacetones and phenates, as well as copper stearate and palmitate, have shown significantly lowered friction and wear.

Copper-based organometallic compounds can give maximum benefit when used as multifunctional additives to reduce friction and wear in liquid lubricants or greases, fuels, cutting fluids, and hydraulic fluids.

Such organometallic salt compositions that are useful in reducing friction and wear, have been described in WO 2017/005967 and U.S. Ser. No. 10/144,896. However, not all organometallic salt compositions prevent or alleviate the above mentioned issues causing failure in heavy-duty mechanical equipment, such as wind turbines.

Wind turbines are examples of equipment that are subject to exceptionally high forces and torque. Also other industrial equipment can experience similar forces. Particularly the bearings in such equipment may experience increasing loads and high stress caused by said high forces and torque, which can eventually lead to unexpected and premature failures.

Such widespread tribological failures are caused by fatigue of the metal due to the formation of subsurface three-dimensional branching cracks. The cracks are bordered by white etching microstructures, and thus named White Etching Cracks (WEC).

These cracks are different from other types of conventional microstructural changes and effects that occur under severe operating conditions. They have not been found to be related to regular wear, and the WECs affect both the metal surface and the subsurface. Thus, common lubrication is not a solution to the problem.

WECs often develop at moderate speeds and loads that eventually lead to premature failures. These failures are unpredictable using standard procedures to assess fatigue-life. The problems are not specific to particular equipment manufacturers or component designs. WECs occur in various industrial applications, with different bearing types, lubricants, and steel grades. This is an especially serious problem because the cause of WECs is not fully understood. It is also difficult to reproduce the formation of WECs in laboratory test rigs. As a result, there is no consensus on the mechanisms of WEC formation or the root cause.

Key factors that appear to cause WECs are tribochemical hydrogen permeation at steel surfaces that leads to hydrogen embrittlement, especially in high sliding energy conditions. It has been found that WECs may be more prevalent with certain types of lubricant formulations, since lubricants are one potential source of hydrogen causing said embrittlement. Prior art conventional lubricants and lubricant additives can thus actually increase the risk of WECs. For example, extreme-pressure anti-wear additives that are based on highly active sulphur-phosphorous chemistry, cause such an increased risk. These types of additives can damage metal surfaces and may actually promote micropitting leading to premature WEC failures. There is, therefore, an important and urgent need for effective and durable technical countermeasures to solve the WEC problem.

A potential solution that has been promoted as a way to mitigate WECs is the use of lubricants containing high viscosity polyalphaolefin basestocks. Viscosity is generally considered to be one of the most important properties of a lubricant. If the viscosity of an oil is too low, the lubricant will not provide a sufficient film separating the moving parts. Higher viscosity lubricants resist shearing or the "tearing away of one layer of lubricant from another", during the hydrodynamic lubrication. This helps to minimise metal-metal contact, due to the presence of a more durable and robust lubricating film. This can be particularly advantageous under certain severe conditions, such as shock loads and continuous heavy loading, where the higher viscosity lubricants or more likely to remain in their normal hydrodynamic film state. This should therefore theoretically reduce the propagation of cracks that cause WECs problems. However, there is also an important downside of using excessively high viscosity lubricants. They have poorer low temperature properties and increased resistance to flow. Inadequate flow of an overly viscous lubricant can cause lubrication starvation due to poor pumpability. This problem can be especially severe under cold ambient conditions and can actually increase the risk of direct metal-metal contact and surface damage. Thus, there still exists a need for improved solutions to the WEC problem.

Further, despite all the advances in lubricant additives and lubricant oil formulation technologies, there remains a need for lubricant oil additive that provide protection against more specific issues, causing failure in heavy-duty mechanical equipment, such as the above described WECs.

SUMMARY OF THE INVENTION

A purpose of the present invention is therefore to at least alleviate the above mentioned drawbacks, particularly relating to the formation of WECs.

Another purpose of the invention is to provide lubricant additives and/or lubricant additive compositions that are useful in preventing or at least alleviating the formation of white etching cracks in mechanical equipment.

An additional purpose of the present invention is to provide an additive composition consisting of copper based organometallic salts in combination with other suitable components that not only reduces friction but also enables increased wear protection.

A further purpose of the present invention is to provide high-performance lubricants that can ensure long-life operation of mechanical systems by protecting mechanical parts from contact fatigue damages; also protect friction surfaces from hydrogen wear; and enable the self-healing of wear and damages by selective transfer.

These purposes can be achieved by using the lubricant compositions described herein to protect friction surfaces.

The invention is defined by the features of the independent claims. Some specific embodiments are defined in the dependent claims.

It has been surprisingly and unexpectedly found that the organometallic salt compositions described herein, alleviate WEC in a superior manner, compared to existing lubricants.

It is known that this type of organometallic salt, in combination with other components, reduces friction and provides improved protection against conventional wear, but such additives have never previously been used as technical solutions against WEC.

Thus, the present invention relates to the use of organometallic salt compositions as lubricant additives and/or lubricant additive compositions to alleviate the formation of white etching cracks (WEC).

The used organometallic salt compositions are derived from copper and at least one long chain monocarboxylic acid (typically a fatty acid), to produce a lubricant additive composition that has improved capability to alleviate the formation of WECs. This lubricant additive composition can be formulated with other suitable components, leading not only to reduced WECs but also reduced friction.

In addition to providing reduced WECs, these lubricant additive compositions have further advantages, such as enabling increased wear protection, longer oil drain intervals and reduced maintenance as well as extended operational lifetimes.

These lubricant additive compositions also do not comprise high amounts of phosphorus- or sulphur-based compounds, which can propagate formation of WECs, and thus these additive compositions in the present invention do not cause the aggressive chemical attack typical of highly active phosphorus- or sulphur-based compounds, nor degrading of the condition of the friction surfaces in lubricated mechanical equipment.

An additional advantage achieved with the organometallic salt compositions and the lubricant compositions described herein, is that they have a high solubility in all four types of hydrocarbon base oils (Groups I-IV) at a variety of concentrations and a variety of conditions. This is an improvement to conventional organometallic salts used as lubricants, since they are typically not particularly soluble in hydrocarbon oils of groups II-IV.

The high solubility means that the compositions, based on a visual assessment, are fully miscible with the base oil, and do not separate or form sediments or gels upon storage. The assessment is typically performed at a temperature within the range of 18-24° C.

BRIEF DESCRIPTION OF THE DRAWINGS

FIG. 1 is a graph illustrating the amount of hydrogen blocked by a steel membrane treated with a lubricant additive according to the invention, using a untreated membrane as reference.

EMBODIMENTS OF THE INVENTION

Definitions

In the present context, the term "long chain carboxylic acid" is intended to encompass carboxylic acids having a carbon chain of the length $C_{13}$ to $C_{22}$. The chain can be linear or branched.

Similarly, a "short chain carboxylic acid" is intended to cover monocarboxylic acids having less than 6 carbon atoms. Thus, a branched monocarboxylic acid has 4 or 5 carbon atoms.

Thus, it becomes apparent that a "medium chain carboxylic acid", in the present context, has 6 to 12 carbon atoms.

The present invention relates to the use of organometallic salt compositions as lubricant additives and/or lubricant additive compositions to alleviate the formation of white etching cracks (WEC).

Said white etching cracks occur particularly in equipment that are subject to exceptionally high forces and torque. Examples of these are industrial equipment, such as paper mills, crusher mills and lifting gears, but also marine propulsion systems. However, wind turbines have been found to experience particularly frequent premature failures of this type. Thus, the present invention is preferably used on these types of equipment, and particularly on wind turbines, or more specifically on the bearings thereof.

The organometallic salt compositions used in the present invention are, typically, copper salts derived from one or more long chain monocarboxylic acids, optionally in combination with one or more short or medium branched-chain monocarboxylic acids.

If used, the content of short or medium branched-chain carboxylic acid in the organometallic salt composition is preferably in the range of 2 to 20 wt %.

The preparation of the organometallic salts used in the present invention generally involves the reaction of copper carbonate, with said one or more long chain monocarboxylic acid, for example oleic acid, thus forming an intermediate salt. A wide range in the proportions of the carboxylic acid may be employed, preferably such that the molar ratio of the carboxylic acid to the copper carbonate reactant ranges from 1:1 to 20:1.

The copper carbonate according to a preferred embodiment of the invention, may be mixed with another metal carbonate, typically comprising one of silver, gold, palladium, cobalt, lead, tin, bismuth, molybdenum, titanium, tungsten and nickel as metal element. More preferably, the other metal carbonate comprises cobalt.

The long chain monocarboxylic acids that are useful may be characterized by way of certain common aspects of their structures. The intermediate organometallic salts used in the invention may, more specifically, be derived from the reaction of monocarboxylic acids in the range $C_{13}$ to $C_{22}$ and the copper carbonate.

Preferably unsaturated acids should be used such as linolenic, linoleic and oleic acids.

Examples of other acids that can be employed include saturated monocarboxylic acids such as lauric, myristic, palmitic or stearic. Saturated and unsaturated branched monocarboxylic acids can also be used, for example iso-stearic acid. Optionally naphthenic acids or synthetic carboxylic acids can be used.

In the preparation of the organometallic salt used in the present invention, the intermediate salt is first prepared as described above, whereafter the optional short or medium chain carboxylic acid may be added, particularly in order to facilitate the formation of a salt that is liquid at room temperature. Before said addition, the intermediate salt is preferably heated to a temperature of at least about 60° C., and the heating continued until the salt is in liquid form. Then the short or medium chain carboxylic acid may be added with vigorous mixing.

If adding the short or medium branched-chain monocarboxylic acid, it can be advantageous under certain circumstances to use a medium chain acid. For example, one preferred combination of long chain carboxylic acid and short or medium chain carboxylic acid is a combination of oleic acid with 2-ethylhexanoic acid, which has a particularly beneficial effect on the solubility of the composition and enhanced ambient fluidity liquid properties.

A wide range in the proportions of the short or medium branched chain monocarboxylic acid may be employed, such that the weight ratio of the intermediate organometallic salt and the short or medium branched-chain monocarboxylic acid may range from 2:1 to 50:1. A ratio of 5:1 to 20:1 is preferred, and the range 10:1 to 20:1 is most preferred.

Saturated short or medium branched-chain monocarboxylic acids are preferred in the present invention. They should contain at least one branched alkyl group. Preferably they contain 4 to 11 carbon atoms, more preferably 6 to 10 carbon atoms, and most preferably 8 carbon atoms. Examples of such saturated short or medium branched-chain monocarboxylic acids include 2-ethylhexanoic acid, 2-methylbutyric acid, 2-ethylbutanoic acid, 2-methylpentanoic acid, 3-methylpentanoic acid, 4-methylpentanoic acid, 2-methylhexanoic acid, 5-methylhexanoic acid, 4-methyloctanoic acid, and 4-methylnonanoic acid, preferred alternatives being 2-ethylbutyric acid and 2-ethylhexanoic acid, and a particularly preferred alternative being 2-ethylhexanoic acid.

The organometallic salt composition according to the current invention can be combined with an activated complex containing a first metal component, a second metal component, and particles comprising the first metal component. This combination has been found to give enhanced mitigation of WECs, particularly when particles, such as nanoparticles, are added in-situ to provide a lubricant additive composition, and the particles include the first metal component in metallic form. The second metal component is able to participate in reducing the metal element in the first metal component.

Preferably, the first metal component of the activated complex comprises gold, silver, copper, palladium, tin, cobalt, zinc, bismuth, manganese and/or molybdenum, especially preferably copper and/or cobalt, more preferably copper.

The second metal component of the activated complex preferably comprises tin, bismuth, zinc, and/or molybdenum, especially preferably, tin, bismuth and/or zinc, more preferably tin. Also the second metal component can be added in the form of particles. Thus, it can be advantageous to include the first metal component, in metallic form, into particles including the second metal component.

However, according to a preferred embodiment, particles, preferably nanoparticles, are formed from the first metal component in metallic form, and optionally the second metal component is added to these particles.

The particles of the activated complex, comprising the first metal component, exhibit a diameter in the range of 1 to 10,000 nm, preferably in the range of 5 to 1,000 nm, more preferably in the range of 10 to 500 nm, especially preferably in the range of 15 to 400 nm.

The activated complex preferably further contains a component that functions as a ligand. The ligand can be either a surfactant or a dispersant; examples are succinimide, poylethoxylated tallow amide and diethanol amine. The activated complex preferably also comprises particles including the first metal component and optionally the second metal component. At least one compound improving the solubility of the metal element may be added, e.g. epoxy resin of diethylene glycol or epoxidized dipropylene glycol. In addition, at least one reducing agent may be added, e.g. diphenyl amine or hexadecyl amine. These preferred components are typically added to the particles of the first metal component.

Preferably, the lubricant additive composition described above comprises a soluble metal compound derived from the first metal component. Preferably, this lubricant additive composition is able to form metal plating.

In the production of the activated complex, one or more alcohols are advantageously used as a reductant, solvent and/or co-solvent. Preferably, an alcohol such as glycols with alkyl groups having 1 to 20 carbon atoms, e.g. diethylene glycol. Further, an alcohol having 1 to 20 carbon atoms, preferably 4 to 12 carbon atoms, such as octanol, is advantageously present.

Preferably, the weight ratio of the organometallic salt composition to the activated complex is in the range of 10,000:1 to 1:1. The preparation of the relevant activated complexes and their combination with organometallic salt compositions to give the products that can be used according to the present invention is illustrated further in example 12 below. Processes for obtaining the activated complex referred to above are disclosed in further detail in WO2015/173421, hereby incorporated by reference.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided to provide a thorough understanding of embodiments of the invention. One skilled in the relevant art will recognize, however, that the invention can be practiced without one or more of the specific details.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The following non-limiting examples are intended merely to illustrate the advantages obtained with the embodiments of the present invention.

EXAMPLES

Example 1: Preparation of a Modified Organometallic Salt According to the Present Invention The modified organometallic salt of the present invention can be prepared by reacting a metal salt with a fatty acid, so that the metal content of the added metal salt provides a metal concentration in the final product salt in the range of 8-9 w-%. The reaction typically proceeds at a temperature of at least 60° C. until the salt is in liquid form. Thereafter, a branched short- or medium-chained monocarboxylic acid is added, using a wide range of proportions, such as 2-50% of the total mass of the mixture.

In a more precise procedure, a copper carbonate was reacted with oleic acid, to obtain a copper oleate, so that the copper concentration in the final salt was in the range of 8-9 w-%. The reaction was conducted in an oxygen-free environment for 16 h at 150° C. After said reaction, 2-ethylhexanoic acid was added at a ratio of 7.5% of the total mass of the mixture. This addition will result in a copper-based organometallic salt composition that is liquid at room temperature and has a melting point of 10° C., whereas a copper oleate with a metal content in the range of 8-9% not containing the branched short- or medium-chain monocarboxylic acid has a melting point of 55° C.

The melting temperature was determined visually. The metal content was verified by analysis with MP-AES.

Example 2: How Melting Point is Affected by the Amount of Added Short-Chain Branched Organic Acid A modified organometallic salt was prepared according to the present invention by adding 2-ethylhexanoic acid at an amount of 11.25% of the total mass of the modified organometallic salt to copper oleate with a metal content in the range of 8-9%. The addition of 11.25% of 2-ethylhexanoic acid lowered the melting temperature of the modified organometallic salt to 4° C., whereas a modified organometallic salt of Example 1 containing 7.5% 2-ethylhexanoic acid has a melting point of 10° C., and an organometallic salt consisting of only copper oleate has a melting point of 55° C. The melting temperature was determined visually.

Example 3: How Melting Point is Affected by the Amount of Added Short-Chain Branched Organic Acid A modified organometallic salt was prepared according to the present invention by adding 2-ethylhexanoic acid at an amount of 15% of the total mass of the modified organometallic salt to copper oleate with a metal content in the range of 8-9%. The addition of 15% of 2-ethylhexanoic acid lowered the melting temperature of the modified organometallic salt to below 0° C., whereas a modified organometallic salt of Example 2 containing 11.25% 2-ethylhexanoic acid has a melting point of 4° C., a modified organometallic salt of Example 1 containing 7.5% 2-ethylhexanoic acid has a melting point of 10° C., and an organometallic salt consisting of only copper oleate has a melting point of 55° C. The melting temperature was determined visually.

Example 4: How Melting Point is Affected by Metal Content of the Metal Carboxylate and the Amount of Branched Short- or Medium-Chain Monocarboxylic Acid To determine how the metal content and the content of short- or medium-chain monocarboxylic acid affect the melting temperatures of the modified organometallic salts, modified organometallic salts according to the present invention containing copper oleate with metal content in the range of 2-0% and 2-ethylhexanoic acid in the range of 1-10% were prepared. The melting temperatures were determined visually and are listed in Table 1. The metal content was verified by analysis with MP-AES.

TABLE 1

Melting temperatures of copper-based modified organic salts with metal content in the range of 2-9% with an addition of 2-ethylhexanoic acid in the range of 1-10%.

| % Cu | 0% 2-EHA | 1% 2-EHA | 2% 2-EHA | 3% 2-EHA | 4% 2-EHA | 5% 2-EHA | 6% 2-EHA | 7% 2-EHA | 8% 2-EHA | 9% 2-EHA | 10% 2-EHA |
|---|---|---|---|---|---|---|---|---|---|---|---|
| 2.2% | 16° C. | 2° C. | <0° C. | <0° C. | <0° C. | <0° C. | <0° C. | <0° C. | <0° C. | <0° C. | <0° C. |
| 4.4% | 35° C. | 21° C. | 13° C. | 6° C. | 5° C. | 3° C. | 2° C. | <0° C. | <0° C. | <0° C. | <0° C. |
| 6.2% | 40° C. | >room temp | >room temp | >room temp | >room temp | 14° C. | 7° C. | 4° C. | 2° C. | <0° C. | <0° C. |
| 8.6% | 50° C. | >room temp | >room temp | >room temp | >room temp | >room temp | >room temp | 10° C. | 8° C. | 5° C. | 2° C. |

Example 5: Preparation of Other Organometallic Salts According to the Present Invention Metal carboxylates were prepared by reacting metal carbonates with oleic acid under vacuum at 150° C. for 16 h. The metal carbonates used were bismuth subcarbonate and cobalt carbonate. The metal content by weight of the metal oleates were 5-10%. 2-ethyl hexanoic acid was added at 5%, 10% and 15% of total mass of the organometallic salt until the melting temperature of the organometallic salt reached 0° C. or below 0° C. The melting temperatures are listed in Table 2.

TABLE 2

Melting temperatures of bismuth and cobalt-based organometallic salt compositions.

| Metal carboxylate | 0% 2-EHA | 5% 2-EHA | 10% 2-EHA | 15% 2-EHA |
|---|---|---|---|---|
| Bismuth oleate (5% Bi) | 3° C. | <0° C. | — | — |
| Cobalt oleate (10% Co) | 65° C. | 35° C. | 15° C. | <0° C. |

Example 6: Solubility of the Organometallic Salt Composition of the Present Invention in a Group II Base Oil Copper based modified organometallic salts of the present invention as prepared in Examples 1, 2 and 3 were blended into a Group II base oil at concentrations in the range of 0.3-3.0%. Solubility was determined visually by following the samples for 14 weeks. The results are presented in Table 3. The modified organometallic salts were regarded as soluble if no phase separation or opacity of the sample was observed.

TABLE 3

Solubility in a Group II base oil

| Organometallic salt of the present invention | 0% 2-EHA reference | 7.5% 2-EHA | 11.25% 2-EHA | 15% 2-EHA |
|---|---|---|---|---|
| 0.3% | slightly insoluble | soluble | soluble | soluble |
| 0.5% | phase separation | soluble | soluble | soluble |
| 1% | phase separation | soluble | soluble | soluble |
| 1.5% | phase separation | slightly insoluble | slightly insoluble | slightly insoluble |
| 2% | phase separation | phase separation | phase separation | phase separation |
| 2.5% | phase separation | phase separation | phase separation | phase separation |
| 3% | phase separation | phase separation | phase separation | phase separation |

The solubility of copper oleate in a Group II base oil is below 0.3%. According to the present invention, the addition of 2-ethylhexanoic acid to copper oleate results in an organometallic salt composition with improved solubility in the said base stock.

Example 7: Solubility of the Present Invention in Group III Base Oils

Copper based modified organometallic salts of the present invention as prepared in Examples 1, 2 and 3 were blended into a Group III base oil at concentrations in the range of 0.3-3%. Solubility was determined visually by following the samples for 12 weeks. The results are presented in Table 4. The modified organometallic salts were regarded as soluble if no phase separation or opacity of the sample was observed.

TABLE 4

Solubility in a Group III base oil.

| Organometallic salt of the present invention | 0% 2-EHA | 7.5% 2-EHA | 11.25% 2-EHA | 15% 2-EHA |
|---|---|---|---|---|
| 0.3% | phase separation | soluble | soluble | soluble |
| 0.5% | phase separation | soluble | soluble | soluble |
| 1% | phase separation | soluble | soluble | soluble |
| 1.5% | phase separation | soluble | soluble | soluble |
| 2% | phase separation | soluble | soluble | soluble |
| 2.5% | phase separation | slightly insoluble | soluble | soluble |
| 3% | phase separation | slightly insoluble | soluble | soluble |

Copper oleate is insoluble in a Group III base oil. According to the present invention the addition of 2-ethylhexanoic acid to copper oleate results in a modified organometallic salt with improved solubility in the said base stock.

Example 8: Solubility of the Present Invention in a Group IV Base Oil

Copper based modified organometallic salts of the present invention as prepared in Example 1, 2 and 3 were blended into a Group II base oil at concentrations in the range of 0.3-3.0%. Solubility was determined visually by following the samples for 14 weeks. The results are presented in Table 5. The modified organometallic salts were regarded as soluble if no phase separation or opacity of the sample was observed.

TABLE 5

Solubility in a Group IV base oil (PAO).

| Organometallic salt of the present invention | 0% 2-EHA reference | 7.5% 2-EHA | 11.25% 2-EHA | 15% 2-EHA |
|---|---|---|---|---|
| 0.3% | clear phase separation | soluble | soluble | soluble |
| 0.5% | clear phase separation | soluble | soluble | soluble |
| 1% | clear phase separation | slightly insoluble | slightly insoluble | slightly insoluble |
| 1.5% | clear phase separation | phase separation | phase separation | phase separation |
| 2% | clear phase separation | clear phase separation | clear phase separation | clear phase separation |
| 2.5% | clear phase separation | clear phase separation | clear phase separation | clear phase separation |
| 3% | clear phase separation | clear phase separation | clear phase separation | clear phase separation |

Copper oleate is insoluble in a Group IV base oil. According to the invention the addition of 2-ethylhexanoic acid to copper oleate results in a modified organometallic salt with improved solubility in the said base stock.

Example 9: Preparation of an Organometallic Salt Composition by Adding a Branched Long-Chain Monocarboxylic Acid to Copper Oleate To investigate the possibility of obtaining a modified organometallic salt containing a branched long-chain monocarboxylic acid with a melting temperature below ambient temperature, modified organometallic salts were prepared by adding iso-stearic acid at an amount of 1-7%, 10% and 15% of the total mass of the modified organometallic salt to copper oleate with a metal content in the range of 8-9%. The iso-stearic acid was added to copper oleate heated to 60° C. under vigorous mixing. The samples were stirred for 15 minutes to ensure homogeneity. The samples solidified as the temperature of the samples reached ambient temperature.

Example 10: Tribological Effects of the Organometallic Salt Composition

The tribological effects of the organometallic salt composition was demonstrated in tribology tests on a ball-on-three-plates system. An organometallic salt composition of the present invention was prepared by mixing copper oleate with 8 w-% 2-ethylhexanoic acid under vigorous mixing at 60-70° C. The composition was added to Chevron Taro 30 DP 40 in concentrations of 0.3%, 1% and 3% and heated to 60-70° C. under stirring for 15 min. The homogeneous oil mixtures were allowed to cool at ambient conditions. The samples were tested by tribological measurements using an Anton Paar rotational rheometer.

The measurement starts with a running-in phase to ensure flattening of the sample and constant measuring conditions. This is done at 1200 rpm for 30 minutes. After running-in the friction behaviour is measured in the "Striebeck phase" during the next 10 minutes. The measuring regime starts at 0 rpm and the speed increases during the 10 minutes to 3000 rpm. The normal force is 6 N and the temperature 100° C. throughout the measurement. Wear is measured by analysing the wear scars on the plates with optical microscope and imaging software after friction analysis.

In Examples 11 and 12, the following parameters for friction and wear tests are used:

| | |
|---|---|
| Normal force FN | 6N |
| Temperature | 100° C. |
| Running-in phase | 1200 rpm, 30 min |
| Striebeck phase | 0-3000 rpm, 10 min |

The results of this testing are given in Tables 6 and 7.

TABLE 6

Friction behaviour of the samples.

| Sample description | Weight ratio | COF at 0.0001 m/s | COF at 0.001 m/s | COF at 0.01 m/s | COF at 0.1 m/s | COF at 1 m/s |
|---|---|---|---|---|---|---|
| Reference oil/no additive | 100/0 | 0.121 | 0.121 | 0.0976 | 0.109 | 0.0987 |
| Oil/organometallic salt composition | 99.7/0.3 | 0.0578 | 0.0767 | 0.0846 | 0.1035 | 0.0780 |
| Oil/organometallic salt composition | 99/1 | 0.0538 | 0.0642 | 0.0782 | 0.0983 | 0.088 |
| Oil/organometallic salt composition | 97/3 | 0.0506 | 0.0588 | 0.0694 | 0.0886 | 0.0591 |

TABLE 7

Wear behaviour of the samples.

| Sample description | Weight ratio | Wear rate [nm/h] |
|---|---|---|
| Reference oil/no additive | 100/0 | 4192 |
| Oil/organometallic salt composition | 99.7/0.3 | 2442 |
| Oil/organometallic salt composition | 99/1 | 2176 |
| Oil/organometallic salt composition | 97/3 | 3589 |

From the tribology measurements it became apparent that the composition of the present invention has an advantageous impact on the friction and wear behaviour.

Example 11: Tribological Effects of the Lubricant Additive Composition

An activated complex was added to a reducible adduct in order to demonstrate the tribological effects of the lubricant additive composition in tribology tests on a ball-on-three-plates system. A composition of the present invention was prepared by adding an activated complex as described in international patent application PCT/EP2015/060811 to the organometallic salt composition as prepared in Example 9 at a ratio of 2.35 w-% under vigorous mixing at 60-70° C. The composition of the present invention was added to Chevron Taro 30 DP 40 at concentrations of 0.3%, 1% and 3% and heated to 60-70° C. under stirring for 15 min. The homogeneous oil mixtures were allowed to cool at ambient conditions. The samples were tested by tribology measurements using an Anton Paar rotational rheometer according to the conditions described in Example 9. The results are given in Table 8 and 9.

TABLE 8

Friction behaviour of the samples.

| Sample description | Weight ratio | COF at 0.0001 m/s | COF at 0.001 m/s | COF at 0.01 m/s | COF at 0.1 m/s | COF at 1 m/s |
|---|---|---|---|---|---|---|
| Reference oil/no additive | 100/0 | 0.121 | 0.121 | 0.0976 | 0.109 | 0.0987 |
| Oil/additive composition | 99.7/0.3 | 0.0706 | 0.0692 | 0.07745 | 0.0955 | 0.0755 |
| Oil/additive composition | 99/1 | 0.06875 | 0.06475 | 0.07435 | 0.0928 | 0.0755 |
| Oil/additive composition | 97/3 | 0.0539 | 0.05545 | 0.06805 | 0.0876 | 0.0825 |

TABLE 9

Wear behaviour of the samples.

| Sample description | Weight ratio | Wear rate [nm/h] |
|---|---|---|
| Reference oil/no additive | 100/0 | 4192 |
| Oil/organometallic salt composition | 99.7/0.3 | 3059 |
| Oil/organometallic salt composition | 99/1 | 1924 |
| Oil/organometallic salt composition | 97/3 | 1870 |

From the tribology measurements it became apparent that the composition of the present invention has an advantageous impact on the friction and wear behaviour.

Example 12: Preparation of Combinations of an Activated Complex and an Organometallic Salt Composition According to the Invention a) Organometallic Salt Composition Based on Copper The preparation of the activated complex involves a three-step process.

The first step is preparation of copper (II) chloride solution. Diethylene glycol (about 3.5 kg) was placed in a glass-lined vessel fitted with a stirrer and heating capability. This was heated to about 40° C. and copper chloride (0.357 kg) was slowly added with stirring to ensure the material is totally dissolved. C-5A succinimide (2.1 kg) was then slowly added with stirring but no heating. Diphenylamine (1.72 kg) was next added in small portions and the mixture was stirred to ensure it was homogenous. Finally DEG-1 epoxy resin (diethylene glycol 1, 1.86 kg) was added and thoroughly stirred.

The second step is preparation of tin (IV) chloride solution. In a separate glass-lined vessel fitted with a stirrer and heating capability, tin (IV) chloride pentahydrate (4.2 kg) was dissolved in octanol (about 9.8 kg) by stirring the mixture at about 40° C.

The third step is making of the activated complex. In a separate glass-lined vessel fitted with a stirrer and cooling capability, the tin (IV) chloride solution prepared above was added to the copper (II) chloride solution also prepared above under stirring. The tin (IV) chloride solution was added in small portions and the temperature was maintained below 50° C. After the addition was complete the mixture was stirred for a further period to ensure it was homogenous.

The activated complex (3 grams) was added to a solution of copper-based organometallic salt composition (125 grams) prepared according to Example 1 in a glass-lined vessel fitted with a stirrer and heating capability. The temperature of the mixture was maintained at about 60° C. and stirred for a further period to ensure it was homogenous.

b) Organometallic Salt Composition Based on Cobalt

A modified organometallic salt according to the present invention was prepared by reacting cobalt carbonate with oleic acid, so that the metal content of the metal carboxylate provided a metal concentration in the final salt in the range of 8-9 w-%, after which 2-ethylhexanoic acid was added to the metal carboxylate.

Cobalt carbonate hexahydrate and oleic acid were reacted in an oxygen-free environment for 16 h at 150° C. After the reaction, 2-ethylhexanoic acid was added to the cobalt oleate at a ratio of 10% of the total mass of the mixture. This resulted in a cobalt-based organometallic salt composition that is liquid at room temperature and has a melting point of 15° C. The melting point was determined visually. The metal content was verified by analysis with MP-AES.

Preparation of the activated complex was carried out as described above, in Example 12a).

The activated complex (3 grams) made above was added to the cobalt-based organometallic salt composition (125 grams) in a glass-lined vessel fitted with a stirrer and heating capability. The temperature of the mixture was maintained at about 60° C. and stirred for a further period to ensure it was homogenous.

Example 13: Demonstration of Combinations of an Activated Complex and an Organometallic Salt Composition According to the Invention to Alleviate WECs FE8-25 Pitting Test—An assessment was made of the influence of the lubricant additive to alleviate the formation of white etching cracks with the FAG FE8 bearing test rig. The test conditions were drive speed 750 rpm; load 60 kN; and temperature 100° C. The test bearings were axial cylindrical roller bearings (F-562831), The rate of lubricant flow circulation was 0.125 l/min. The low reference oil without the lubricant additive typically produces WECs within 30 to 45 hours. The test oil with the addition of 3% wt of the lubricant additive reached a running time of 422 hours with no formation of WECs. This test result demonstrates that the addition of the lubricant additive produced a tenfold improvement in WEC lifetime performance.

Example 14: Demonstration of Combinations of an Activated Complex and an Organometallic Salt Composition According to the Invention to Inhibit Hydrogen Permeation and Diffusion into a Steel Hydrogen Permeation Tests—A series of permeation tests were carried out according to DIN EN ISO 17081 procedure, (Method of measurement of hydrogen permeation and determination of hydrogen uptake and transport in metals by an electrochemical technique). The objective was to determine the capability of the copper organometallic salt based lubricant additive to block hydrogen. The permeation cell consisted of two electrochemical cells. The first cell, the charging cell, was filled with sulphuric acid ($H_2SO_4$) and the second cell, the recombination cell, was filled with sodium hydroxide (NaOH). The charging cell and the recombination cell were separated by the permeation sample (steel membrane). In the charging cell hydrogen atoms are formed by electrolysis, while in the recombination cell a current is measured due to recombination of diffused hydrogen atoms to form hydrogen molecules. The permeation sample was conditioned by rubbing with a steel cylinder at contact pressure of 60 MPa.

When hydrogen was passed through a steel membrane, its recombination generated a current. The electrical current was measured as function of time. This was used to quantify the amount of hydrogen that was blocked by the membrane. Tests were carried out with a steel membrane treated with the lubricant additive and also an untreated membrane as reference (see FIG. 1). The untreated membrane showed a higher saturation concentration and longer time to reach saturation than the lubricant additive treated case. These results demonstrate that the lubricant additive reduces the amount of hydrogen that permeates into the steel membrane. Both untreated and treated membranes showed similar diffusion behaviour until the saturation point of the treated sample was reached.

Vacuum tests were also carried out to determine if the lubricant additive is able to prevent the generation of hydrogen. The results show that untreated oil and oil plus the lubricant additive both produce free hydrogen by degrading the oil. This demonstrates that the lubricant additive does not inhibit the generation of hydrogen. It is postulated that the mechanism of hydrogen blocking could be could be due to local electrochemical cells, comprising the steel membrane the copper tribofilm. As a result, less hydrogen diffuses into steel and, as a consequence, steel surfaces lubricated with the lubricant additive show less hydrogen embrittlement and other failure mechanisms related to hydrogen.

INDUSTRIAL APPLICABILITY

The present invention can be used to alleviate the formation of white etching cracks (WEC) occurring in heavy duty mechanical equipment under severe operating conditions, particularly to alleviate the formation of WECs in the bearing supports of such equipment.

In particular, the present use of the organometallic salt compositions is beneficial in wind turbines, which are known to be subject to exceptionally high forces and torque.

CITATION LIST

WO 2017/005967
WO 2015/173421

The invention claimed is:

1. A method for alleviating formation of white etching cracks (WEC) in a component of mechanical equipment, the method comprising:
   applying an organometallic salt composition to a surface of the component of the mechanical equipment, wherein the component has or is susceptible to white etching cracks (WEC),
   wherein the organometallic salt composition comprises a copper salt of one or more long chain monocarboxylic acid(s) having a carbon chain of the length $C_{13}$ to $C_{22}$, and
   wherein the organometallic salt composition is effective in alleviating the formation of the white etching cracks (WEC) in the component.

2. The method according to claim 1, wherein the long chain carboxylic acid is an unsaturated acid.

3. The method according to claim 1, wherein the long chain carboxylic acid is linolenic, linoleic or oleic acid, preferably oleic acid.

4. The method according to claim 1, wherein the copper salt of the one or more long chain carboxylic acid is copper oleate.

5. The method according to claim 1, wherein the composition comprises the salt of two different long chain monocarboxylic acids.

6. The method according to claim 1, wherein the composition is prepared by reacting a long chain carboxylic acid with copper carbonate.

7. The method according to claim 6, wherein a molar ratio of the long chain carboxylic acid to the copper of the copper carbonate is from 1:1 to 20:1.

8. The method according to claim 1, wherein the organometallic salt composition forms part of a lubricant additive composition, optionally combined with further additive components.

9. The method according to claim 1, wherein the organometallic salt composition is combined with an activated complex comprising a first metal component, a second metal component, and particles comprising the first metal component.

10. The method according to claim 9, wherein the first metal component comprises gold, silver, copper, palladium, tin, cobalt, zinc, bismuth, manganese and/or molybdenum.

11. The method according to claim 1, wherein the second metal component comprises tin, bismuth, zinc, and/or molybdenum.

12. The method according to claim 1, wherein the organometallic salt is combined with an activated complex containing particles comprising a first metal component, as part of a lubricant additive composition.

13. The method according to claim 9, wherein the first metal component comprises copper and/or cobalt.

14. The method according to claim 9, wherein the first metal component comprises copper.

15. The method according to claim 9, wherein the second metal component comprises tin, bismuth and/or zinc.

16. The method according to claim 9, wherein the second metal component comprises tin.

17. The method according to claim 1, wherein the organometallic salt composition is combined with an activated complex comprising particles comprising a first metal component, as part of a lubricant additive composition, in order to ensure full miscibility with a base oil of the lubricant, and no separation or formation of sediments or gels upon storage.

18. The method according to claim 1, wherein the copper salt of one or more long chain monocarboxylic acid(s) has a carbon chain of the length $C_{13}$ to $C_{20}$, prepared using a step of reacting the one or more long chain monocarboxylic acid(s) with copper carbonate.

19. The method according to claim 1, wherein:
   the organometallic salt composition is combined with an activated complex comprising a first metal component, a second metal component, participating in reducing the metal element in the first metal component, and particles comprising the first metal component,
   the first metal component comprises copper and/or cobalt, and
   the second metal component comprising tin, bismuth and/or zinc.

20. The method according to claim 1, wherein the long chain carboxylic acid is oleic acid.

21. The method according to claim 1, wherein the component is a component from a member selected from the group consisting of a paper mill, a crusher mill, a lifting gear, a marine propulsion system, and a wind turbine.

22. The method according to claim 1, wherein the component is a component of a wind turbine.

23. The method according to claim 1, wherein the component comprises a bearing of a wind turbine.

* * * * *